United States Patent Office 3,159,171
Patented Dec. 1, 1964

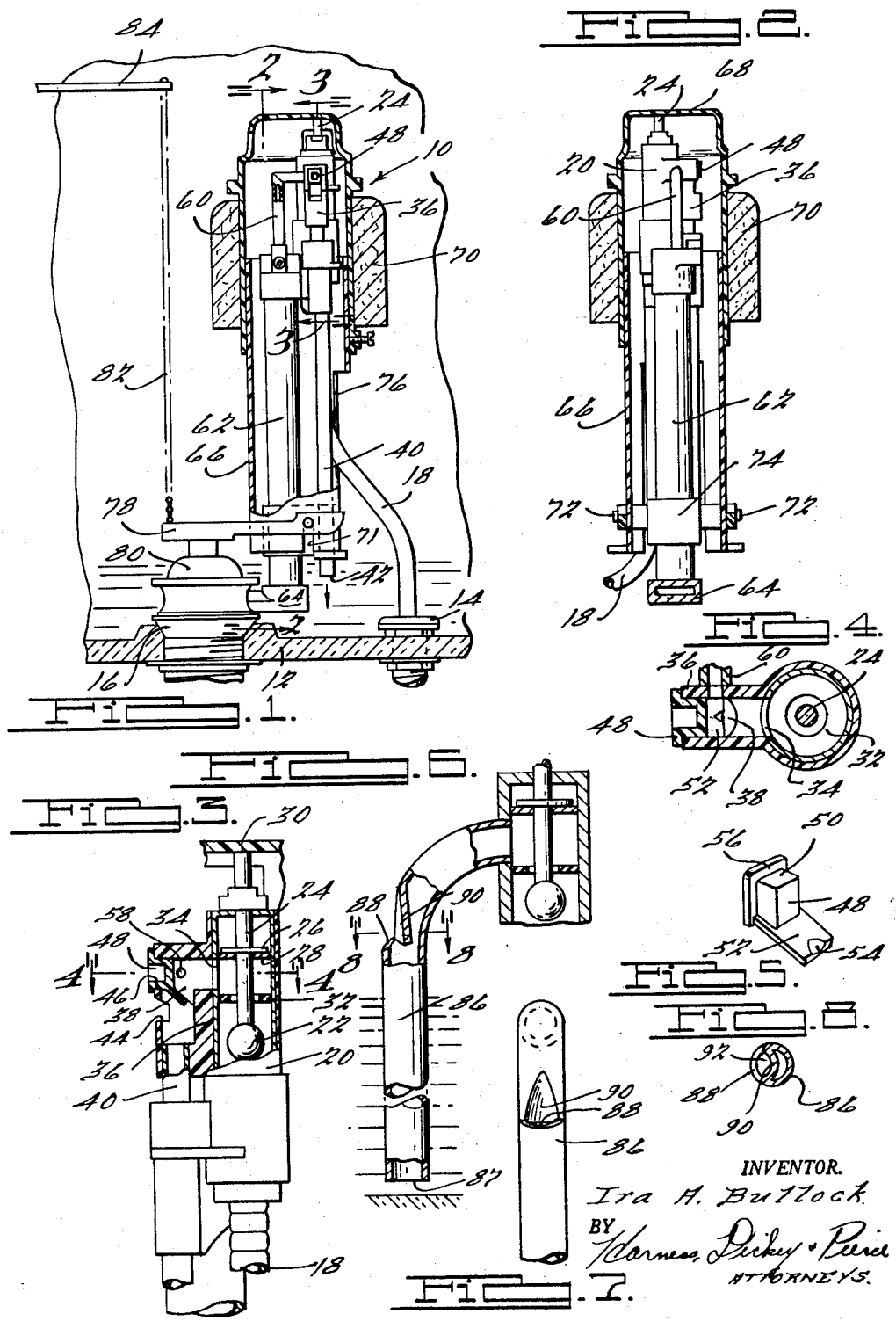

3,159,171
VACUUM BREAKER
Ira A. Bullock, 211 Spring St., Yale, Mich.
Filed Nov. 10, 1960, Ser. No. 68,420
1 Claim. (Cl. 137—218)

This invention relates generally to plumbing equipment and more particularly to a novel vacuum breaker or anti-siphoning device for use in conjunction with a fluid supply conduit having a submerged discharge opening, to prevent the reverse siphoning of fluid therethrough.

This invention is adapted for use with any type of fluid supply conduit having a discharge opening disposed below the normal fluid level in the reservoir supplied thereby, such as, for example, those associated with the flush valves used in sterilizing tanks, treatment baths, slop sinks, and more commonly, the fluid supply conduit forming a part of the flushing apparatus in a conventional toilet.

As will be appreciated, in any one of these flushing situations there exists the undesirable possibility of a reverse siphoning condition occurring, wherein waste or otherwise contaminated material in the reservoir is siphoned in the reverse direction into the supply line, thus contaminating the supply fluid therein. Such a condition might occur in a toilet, for example, when the main water supply was turned off and a water valve was opened or another toiled flushed in some other part of the same building. Should this condition exist, suction created in the supply line by the opening of the remote valve or the like would create a reverse siphoning of the water in the tank or reservoir into the supply line.

In addition, should an overflow condition exist in the toilet bowl simultaneously with such a suction condition in the supply line, there would exist the extremely undesirable likelihood of the contents of the toilet bowl also being drawn into the supply line. In view of the unhealthy sanitation problems which would be created by such reverse siphoning, almost all states, or local governments, require that toilets and the like be equipped with anti-siphoning devices which meet certain specified standards. For example, in many jurisdictions these anti-siphoning devices, generally called vacuum breakers, must be capable of preventing the reverse flow of fluid out of the toilet or tank when a vacuum as high as 28 inches of mercury is created in the supply line.

It is therefore a primary object of the present invention to provide a novel vacuum breaker of extremely simple and hence economical construction for use in conjunction with submerged outlet fluid supply conduits, wherein there is provided means for allowing air rather than discharged fluid to be drawn into the supply line should a vacuum condition exist therein, and in addition, means for effectively and automatically preventing the undesirable escape of supply fluid through the vacuum breaker when a positive pressure condition exists therein, whereby the requirements of the strictest sanitation standards may be met.

A further object of this invention resides in the provision of a vacuum breaker of novel construction adapted for use in conjunction with any type of submerged outlet supply conduit to prevent the reverse siphoning of fluid therethrough, which vacuum breaker utilizes no moving parts, whereby the likelihood of the device becoming defective or worn out is practically non-existent.

Yet a further object of the present invention concerns the provision of a novel vacuum breaker which is readily adapted for use on almost any type of equipment, requiring only a minimum of modification thereto.

Another object thereof relates to the provision of a novel vacuum breaker of extremely simple, effective and inexpensive construction which, in one embodiment, may be formed in any ordinary supply conduit simply by altering the configuration of one portion of the side wall thereof, no additional parts being required.

A still further object thereof resides, in another embodiment, in the provision of a novel vacuum breaker of extremely simple, effective and inexpensive construction particularly suited to economical plastic casting and molding techniques, whereby it may be readily manufactured in conjunction with existing flush valves of plastic construction.

These and other objects of the present invention will become apparent from consideration of the present specification taken in conjunction with the accompanying drawings in which there are shown several embodiments of the invention by way of example, and wherein:

FIGURE 1 is a fragmentary view, partly in section, of one type of conventional flushing apparatus provided with a vacuum breaker embodying the principles of the present invention;

FIGURE 2 is a sectional view thereof taken substantially along line 2—2 in FIGURE 1;

FIGURE 3 is an enlarged fragmentary view thereof, partly in section, taken substantially along line 3—3 in FIGURE 1;

FIGURE 4 is an enlarged transverse sectional view taken along line 4—4 in FIGURE 3;

FIGURE 5 is an enlarged perspective view of one of the parts of the embodiment illustrated in FIGURES 1 through 4;

FIGURES 6 is a side elevational view, partly in section, of a second embodiment of the present invention;

FIGURE 7 is a fragmentary front elevational view thereof; and

FIGURE 8 is a transverse sectional view taken along line 8—8 of FIGURE 6.

Referring to the drawings, there is illustrated in FIGURES 1 through 5 a first embodiment of the present invention in conjunction with a known and commercially available flushing apparatus for toilets. The flushing apparatus, in itself, does not form a part of the present invention, and is disclosed in U.S. Letters Patent No. 2,802,-218, the disclosure in which is incorporated herein by reference. In FIGURES 6 through 8 there is illustrated a second embodiment of this invention which may be incorporated into any desired fluid supply conduit without the provision of additional parts simply by performing certain cutting and swedging or dye casting operations on the supply conduit itself.

Referring to FIGURES 1 through 5, the general construction and function of the disclosed flushing apparatus, indicated generally at 10 is as follows. Flushing apparatus 10 is shown in conjunction with an ordinary toilet tank 12, only a portion of which is shown having an inlet fitting 14 therethrough for supplying fluid from an outside supply line (not shown) upwardly into the toilet unit, and a conventional flush coupling 16 through which the water in tank 12 may flow downwardly into the toilet bowl (not shown). Within inlet fitting 14 there is provided the usual supply line orifice (not shown), the diameter of which is determined by the local supply pressure, the size of the unit and other similar considerations. In operative communication with inlet fitting 14 is a flexible supply line 18 communicating at its upper end with a valve housing 20, having therein a ball valve 22 disposed at the lower end of a vertically moving valve stem 24 which extends upwardly through the upper end of valve housing 20. Valve stem 24 is provided with a stop member 26 adapted to engage the upper surface of a partition 28 within the valve housing 20 to limit the downward movement of the valve stem, and at its upper terminal end is provided with an abutting surface 30. Valve housing 20 is provided with an apertured partition 32 through which inlet fluid may flow in the upward direction when the valve is in the open position, as shown in FIGURE 3, and which forms a valve seat to prevent the flow of inlet fluid when the valve is in the closed position, i.e. when the ball valve 22 is urged upwardly thereagainst. Downstream of apertured partition 32 there is provided in the side wall of valve housing 20 a discharge opening 34.

To receive the valve-controlled flow of fluid through opening 34 there is provided a housing 36 defining a fluid passageway or conduit 38 therein, one end thereof communicating with the opening 34 and the other end thereof communicating, in a fluid tight connection, with a hush tube 40. At the lower end of hush tube 40 there is provided a discharge opening 42, disposed slightly above the bottom of tank 12 but below the normal fluid level therein. As is apparent, hush tube 40 constitutes a fluid supply conduit having a submerged discharge opening, namely opening 42.

In this embodiment, the vacuum breaker construction is located in housing 36. Thus, in accordance with the present invention, housing 36 is provided with a vent opening 44 in the outer wall thereof communicating with fluid passageway or conduit 38. The configuration of vent opening 44 may be clearly seen in FIGURE 3. Adjacent vent opening 44 but spaced thereabove is another opening 46 in the side wall of housing 36, this latter opening being of substantially square configuration in side elevation and also communicating with fluid passageway or conduit 38. Disposed within opening 46 is a baffle member 48, best illustrated in FIGURES 3, 4 and 5, comprising box portion 50 adapted to be snugly received within opening 46, and a downwardly and inwardly extending baffle plate 52 provided with a rounded groove portion 54 on the upper surface at the free end thereof. As can be seen, when baffle member 48 is mounted within opening 46 the free end of baffle plate 52 terminates adjacent to but slightly spaced from the inner wall of fluid passageway 38, as best seen in FIGURES 3 and 4. To provide means by which the baffle member may be securely held in position within vent opening 44, in a manner to be described hereinafter, there are provided flange portions 56 about the periphery of box portion 50 adapted to engage the outer surface of housing 36.

In this particular embodiment, it is contemplated that the entire flushing and vacuum breaker construction be formed of any one of the many suitable plastics available, such as high impact polystyrene, or the like. As will be appreciated, the adaptability of the present apparatus to plastic construction results in greatly reduced manufacturing and fabrication costs since plastics may be so easily die-cast, molded, machined or otherwise formed into shape. In addition, separate plastic parts may be readily and permanently connected together in a fluid tight connection simply by the application of a suitable solvent to the joining surfaces thereof to fuse them together. Thus, baffle member 48 may be readily fused to housing 36, in a permanent fluid tight connection, by the application of a suitable solvent to the engaging surfaces of flange member 56 and housing 36. Furthermore, both baffle member 48 and housing 36 as well as the remainder of the apparatus, may be easily and economically formed in a single molding or die-casting operations using a suitable plastic material, whereby over-all costs may be minimized by both the use of inexpensive materials and economical fabrication techniques.

Considering the remaining flushing apparatus construction, there is also provided in housing 36 a relatively small opening 58, also communicating with fluid passageway or conduit 38. Secured to the outside of housing 36 and communicating with opening 58 is an outwardly and downwardly extending tube 60, the lower open end of which terminates slightly below the upper opening in an overflow tube 62, the latter tube communicating at its lower end with a laterally channeled wing portion 64 forming a part of flush coupling 16 and communicating therewith.

Surrounding the entire apparatus is a tubular member 66 having a closed top portion 68 and a ring of flotation material 70 about the outer periphery thereof. At its lower end tubular member 66 is provided with a pair of opposed slots 71 through which project opposed pivot pins 72 extending outwardly from a fitting 74 secured to the overflow tube 62 adjacent the lower end thereof. Tubular member 66 is also provided with a relatively large vertically extending slot 76 through which flexible supply line 18 may pass.

Pivotally supported upon pins 72 is a yoke member 78 provided at its outer end with a flush valve 80. Also at the outer end of yoke member 78 there is connected a flexible linkage 82, attached at its upper end to the usual trip arm 84.

When the flushing apparatus is in its normal position, wherein the tank 12 is filled with water to the level of the upper end of the overflow tube, the tubular member 66 is maintained in a raised position by the buoyancy of flotation material 70. In this position the closed top 68 is disposed above abutting surface 30 on the valve stem, thereby allowing the valve to be closed by the upward force of the inlet water pressure against ball valve 22. When the toilet is flushed, as by raising the outer end of trip arm 84, flush valve 80 is lifted out of flush coupling 16, whereupon the water in tank 12 flows downwardly into the toilet bowl to flush the latter. When the water level in the tank drops so does tubular member 66, thereby bringing closed top 68 downwardly against the abutting surface 30 on the valve stem to open the valve and allow water to flow into the tank through opening 34, passageway or conduit 38, and hush tube 40. When the tank is empty flush valve 80 is returned to the closed position by gravity and the flow of water starts to refill the tank. At the same time the tank is refilling water is flowing out of fluid passageway or conduit 38 through tube 60 into the overflow pipe and thus into the toilet bowl to refill it while the tank is being refilled. In FIGURE 1 the apparatus is illustrated in a position wherein the water level within the tank is at a minimum and the flush valve has just closed to initiate the refilling of the tank, the ball valve being held in an open position by the engagement of the top of tubular member 66, which is now at its lowest point, with abutting surface 30.

Considering the operation of the vacuum breaker, it will be observed that inlet water flowing into the hush tube 40 from valve housing 20 may pass through the space defined by the free end of baffle plate 52 and the inner side wall of fluid passageway or conduit 38, as best illustrated in FIGURE 4. The escape of this fluid through bent opening 44 is prevented by the baffle plate 52 which, in effect, shields opening 44 by directing the water flowing thereby to the opposite side of fluid passageway 38. In order to maintain a solid stream of water past the free end of baffle plate 52 for silent separation, the free end of the baffle plate is so shaped as to define an opening between it and housing 36 having a cross-sectional area just slightly larger than the cross-sectional area of the supply line orifice. However, should a vacuum condition exist in the supply line, the reduced pressure in fluid passageway or conduit 38 would simply serve to draw in outside air through vent opening 44, there being no way in which water could be drawn back up through hush tube 40 into the supply line, as will be appreciated. In this regard it should be noted that the vacuum breaker is located substantially above the upper end of the overflow tube to eliminate any possibility of there being water anywhere near vent opening 44.

In its broader aspects, the present invention can be visualized, in this first embodiment, as simply the provision in a fluid supply conduit, such as the one defined by parts 18, 20, 36 and 40, of conduit means forming a part thereof and having a vent opening therethrough from the upper edge of which is provided a downwardly and inwardly extending baffle plate. Since this embodiment is essentially an integral construction of fused plastic parts, the baffle plate is, in effect, an extension of the side wall of the housing defining the conduit means, in this embodiment housing 36.

In FIGURES 6 through 8 there is illustrated a second embodiment of a vacuum breaker embodying the principles of the present invention. This embodiment is of broader application and contemplates the provision of an extremely simple and inexpensive vacuum breaker in any fluid supply line, whether it be in the form of drawn or rolled metal tubing, or molded or cast plastic tubing, or the like. In FIGURE 6 there is shown a fluid supply conduit 86 having a submerged discharge opening 87. While in this figure the fluid supply conduit is shown communicating with an inlet valve similar to those used on toilets, it will be appreciated that conduit 86 represents any supply conduit having a submerged discharge opening, the valve to which it is shown attached being illustrated only for exemplary purposes.

As can be seen, the vacuum breaker of this embodiment is extremely simple, and hence economical in construction, and is formed by cutting a very narrow generally transverse slot in the side of the conduit, the lower edge of which is indicated at 88, and then inwardly deflecting the side wall of the conduit immediately above this slot, as at 90, to the position shown.

Thus, the vacuum breaker includes the generally transverse slot in combination with baffle means which, in this embodiment, comprises an inwardly and downwardly extending portion 90 of the side wall of the conduit, the lower edge of the slot defining a downwardly extending vent opening 92 into the conduit and the upper edge of the slot defining the lower edge of the baffle means. As will be apparent, the operation of this embodiment is identical in all respects to the operation of the previously described embodiment.

The second embodiment may be formed by the performance of progressive punch and swedging operations on the side wall of any ordinary copper tube or the like. However, this embodiment may also be formed out of plastic material, or the like, using well known plastic injection molding techniques, whereby the resulting structure is identical to that described and illustrated in FIGURES 6 through 8.

Thus, there is disclosed in the above description and in the drawings several exemplary embodiments of the present invention which fully and effectively accomplish the objects thereof. However, it will be understood by those skilled in the art that the specific details of construction and arrangement of parts, as described, are by way of example only and are not to be construed as limiting the scope of the invention. As will be apparent, variations in the details of construction may be indulged in without departing from the spirit of the invention as herein described or the scope of the appended claim.

What is claimed is:

A vacuum breaker for preventing reverse siphoning in a fluid supply conduit having a submerged discharge opening, comprising: conduit means forming part of a supply conduit having a discharge opening disposed below the normal fluid level in the reservoir supplied thereby, said conduit means being disposed above said normal fluid level; means defining a vent opening in the side wall of said conduit means, said conduit being of substantially circular cross section immediately below said vent opening; and baffle means consisting of a single flat baffle secured to said conduit means, said baffle extending inwardly from immediately upstream of said vent opening more than halfway across said conduit means and being inclined with respect to the axis of said conduit means in the direction of fluid flow therethrough, the free edge of said baffle being provided with a centrally disposed groove in the upper edge thereof and terminating at a point upstream of the downstream edge of said vent opening, whereby supply fluid flowing through said conduit means will be prevented from escaping through said vent opening by said baffle and yet air will be free to pass through said vent opening into said conduit means to prevent reverse siphoning.

References Cited in the file of this patent

UNITED STATES PATENTS

| | | |
|---|---|---|
| 2,082,226 | Stafford | June 1, 1937 |
| 2,151,200 | Goodrie | Mar. 21, 1939 |
| 2,250,291 | Boosey | July 22, 1941 |
| 2,288,247 | Kunstorff | June 30, 1942 |
| 2,329,337 | Criss | Sept. 14, 1943 |
| 2,409,890 | Owens | Oct. 22, 1946 |
| 2,575,905 | Boosey | Nov. 20, 1951 |

FOREIGN PATENTS

| | | |
|---|---|---|
| 184,238 | Switzerland | Aug. 1, 1936 |
| 60,490 | Denmark | Dec. 21, 1942 |